United States Patent [19]

Buratovich

[11] Patent Number: 4,537,155
[45] Date of Patent: Aug. 27, 1985

[54] ANIMAL LEASH

[76] Inventor: Prosper Buratovich, 249 Woodside Ave., Franklin Lakes, N.J. 07417

[21] Appl. No.: 663,414

[22] Filed: Oct. 22, 1984

[51] Int. Cl.³ .............................................. A01K 27/00
[52] U.S. Cl. .................................................... 119/109
[58] Field of Search ............... 119/109, 110, 111, 114; 54/34; 273/58 C, 414

[56] References Cited

U.S. PATENT DOCUMENTS

| 2,337,970 | 12/1943 | Cassell | 119/109 |
| 2,861,547 | 11/1958 | Dale | 119/109 |
| 3,332,398 | 7/1967 | Mintz | 119/109 |
| 3,752,127 | 8/1973 | Baker | 119/109 |

Primary Examiner—Hugh R. Chamblee

[57] ABSTRACT

A versatile animal leash includes a cord with handles secured to both ends thereof. The width of each handle is less than the diameter of an animal's ring collar to enable the handle to be passed therethrough. The length of each handle is greater than the diameter of the collar ring. The cord is at least about twice the length of a standard leash length so that upon holding both handles, the leash exhibits normal length and upon releasing one handle, the same engages the ring collar and the full length of the cord is available as the leash length.

3 Claims, 2 Drawing Figures

ANIMAL LEASH

BACKGROUND OF THE INVENTION

The invention relates to animal leashes and, more particulary, to a leash which is readily extendable to twice its normal length.

Animal leashes of variable length have been proposed heretofore, although generally the same are relatively complex, and hence, expensive. For example, U.S Pat. No. 3,198,175 discloses a leash which is biased to roll up about a spring reel or drum within a shell. Upon attachment of a snap/fastener to a ring on the collar of a dog or cat, etc., and holding the shell in hand, the leash will extend to substantially its entire length. Although the leash, upon winding, is relatively compact, a spring loaded drum and shell, etc. are required as mentioned above and consequently, the resulting device is relatively costly and complex.

Another leash, described in U.S. Pat. No. 3,332,398 employs a single strap which is stitched at the back end to form two hand loops and has an outwardly flared central section. A ring is attached to each hand loop and both rings may be releasably secured by means of a snap fastener to a collar ring of an animal. In this manner, the leash length may be reduced so that the central enlarged portion may be hand held. In order to lengthen the leash, however, the snap fastener must be disengaged to enable one loop to be hand held. Thus, the leash is not readily lengthened and requires that a snap fastener by physically released which may be difficult when the leash is attached to the collar of a large, active dog.

Thus, there is a need for an animal leash of simple construction, low cost and yet is readily extendable when attached to the collar of an animal.

OBJECTS OF THE INVENTION

It is an object of the invention to provide an improved animal leash.

It is another object of the invention to provide an animal leash of simple construction but which is readily extendable during use.

It is yet another object of the invention to provide a readily extendable animal leash comprised of a minimum number of components.

Other objects of the invention will become apparent from the following description of an exemplary embodiment thereof.

SUMMARY

In accordance with the invention, an animal leash is comprised of a cord of a length approximately twice the length of a normal leash length, a handle affixed to each end of said cord with the width of each handle being less than the diameter of a ring of the animal's collar and a length substantially greater than said diameter. By holding both of said handles, the leash will exhibit a normal length and upon releasing one handle, the leash length will be doubled. The released handle will engage the collar ring and thereby will restrain the animal on the lengthened leash. The geometry of the handle is generally rectangular although other shapes, such as the shape of a dog biscuit, etc. may be utilized.

BRIEF DESCRIPTION OF THE DRAWING

The invention will be more clearly understood by reference to the following description of exemplary embodiments thereof in conjunction with the following drawing in which.

DESCRIPTION OF PREFERRED EMBODIMENT

Figure 1:
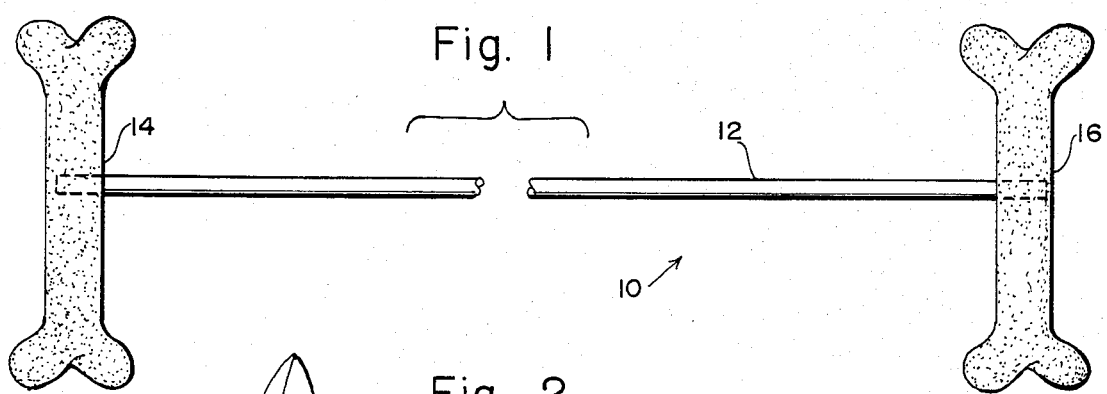
FIG. 1 is a diagrammatic view of the leash according to the invention.

Referring now to FIG. 1, illustrated therein is an exemplary embodiment of a leash 10 according to the invention. Leash 10 is comprised of a cord 12 and handles 14 and 16 affixed to each end of cord 12. Preferably, cord 12 is formed from a strong but pliable material such as ⅛ inch nylon parachute cord having a breaking strength of about 550 lbs. or so. Handles 14 and 16 are permanently affixed to each end of cord 12. Preferably, handles 14 and 16 are identical in shape and are formed of a suitable rigid material such as 'lepan' or the like.

Figure 3:
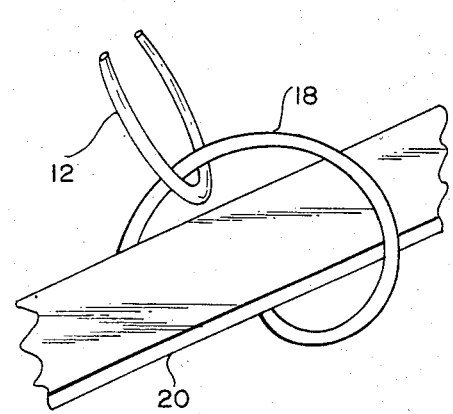
FIG. 3 is a partial diagrammatic view of the leash attached to a ring collar.

Each of handles 14 and 16 are generally rectangular in shape although other shapes may be utilized. For example, as depicted in FIG. 1, handles 14 and 16 may be configured as a 'dog-bone' shape if desired. The width of each handle 14 and 16 is less than the diameter of a standard collar ring 18, illustrated in FIG. 3 with a typical collar 20. It will be understood that an animal neck chain having a ring thereon may be utilized in lieu of collar 20. Handles 14 and 16 may be easily inserted through collar ring 18 as the width of such handles is less than the diameter of collar ring 18. The length of each handle 14 and 16 is greater than the diameter of collar ring 18 to prevent a handle from slipping through ring 18 when in use as will now be described.

Figure 2:
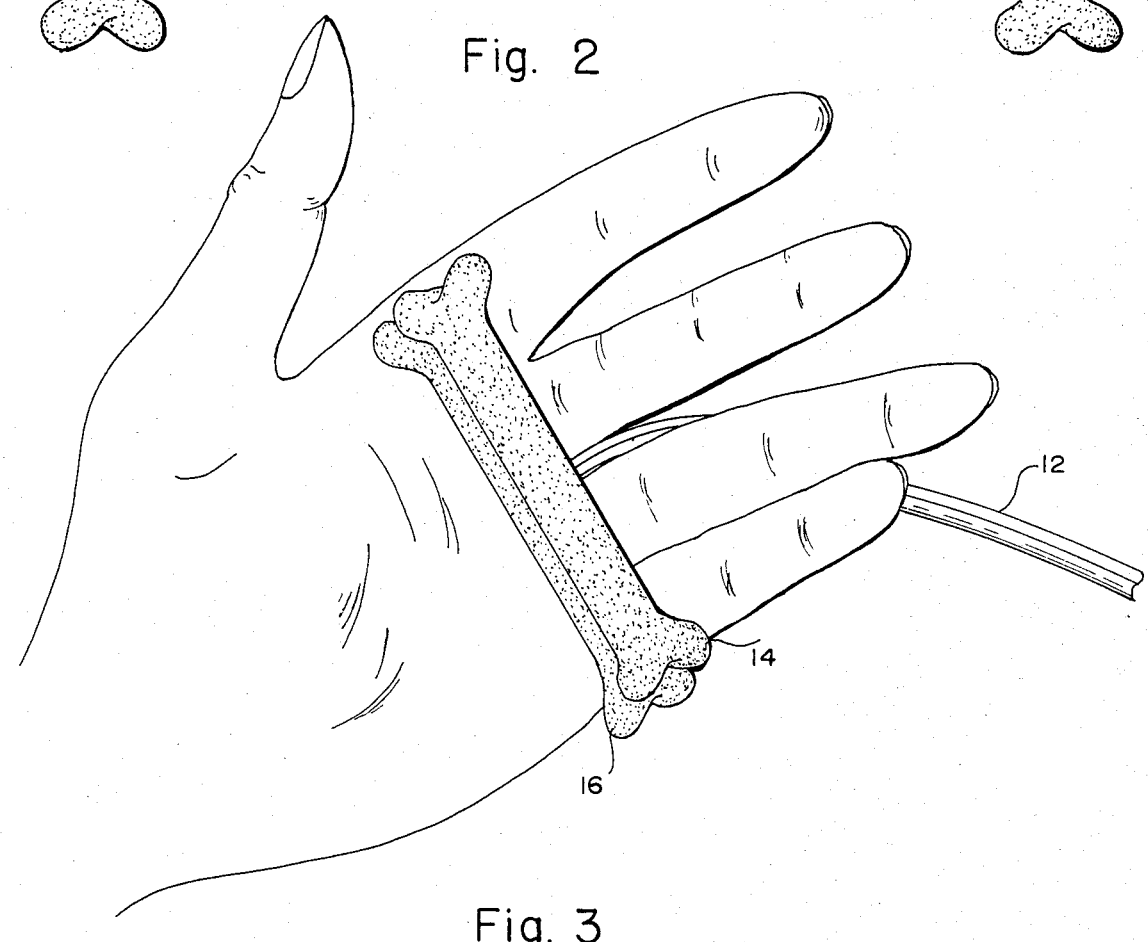
FIG. 2 is a partial view of the leash according to the invention with both handles being held.

The length of cord 12 is preferably twice the normal length of an animal leash, i.e. the length of cord 12 may be about 12–14 ft. or so. Leash 10 is affixed to collar 20 by inserting one of handles 14 or 16 through collar ring 18. Both handles 14 and 16 may be then held together as, for example is shown in FIG. 2 to restrain an animal on leash 10. By so holding handles 14 and 16, leash 10 will be of normal length and when it is desired to give the animal greater range, one of the handles 14 or 16 is simply released. As the slack of cord 12 is taken up oy the animal seeking a greater range, the released handle will engage ring 18. Since the length of each handle 14 and 16 is greater than the diameter of ring 18, the released handle will not slip therethrough. Thus, by simply releasing one of handles 14 or 16, a leash of twice the normal length is easily formed without the need to unlatch any clasp, fasteners, etc.

It will be appreciated that although handles 14 and 16 are illustrated as being generally rectangular, the particular geometric configuration need not be rectilinear and other shapes, such as an hourglass configuration may be employed. Importantly, however, the lesser dimension of handles 14 and 16 is less than the diameter of ring 18 while the longer dimension is to be substantially greater than such ring diameter.

It will be apparent that other modifications to the invention can be made without departing from the spirit and scope thereof and that the scope of the invention is to be determined by the following claims.

I claim:

1. An animal leash for engaging a ring on an animal's collar comprising a cord having a length approximately twice the normal length of an animal leash; handles permanently affixed to each end of said cord with each of said handles being of a generally rectangular configuration and having a width less than the diameter of a ring on said collar and a length substantially greater than said diameter to enable use of said leash at a first length upon both of said handles being held and at a second length, approximately twice said first length, upon release of one of said handles.

2. The animal leash defined in claim 1 wherein said cord is comprised of a nylon material approximately one-eight inch in diameter.

3. The animal leash defined in claim 2 wherein said cord exhibits a break strength of about 550 lbs.

* * * * *